United States Patent

Van Dijk

[15] 3,680,416

[45] Aug. 1, 1972

[54] TOOL POST HOLDER

[72] Inventor: Cornelis Van Dijk, 25 Nantrin Terrace, Milford, Conn. 06460

[22] Filed: Aug. 13, 1970

[21] Appl. No.: 63,435

[52] U.S. Cl. .................................................. 82/36
[51] Int. Cl. ........................................... B23b 29/10
[58] Field of Search .................. 82/36, 37, 35; 29/96

[56] References Cited

UNITED STATES PATENTS 2,684,608  7/1954  Roman ............................ 82/36
2,621,396  12/1952  Gracchi ....................... 82/36 A

FOREIGN PATENTS OR APPLICATIONS 953,941  5/1949  France ............................. 82/37

Primary Examiner—Leonidas Vlachos
Attorney—Smythe & Moore

[57] ABSTRACT

A tool post comprises a body upon which a tool holder is slideably mounted for vertical movement by means of a dove-tail slide and groove and the body has a slit therein which opens into the slide groove. A bolt passes through the slit portion of the body which has its end threadedly received in a block which is laterally movable by means of an eccentric. A vertical slot in the tool holder slide receives a fixed pin, and there is an adjusting bolt passing through the slot with a traveling nut which is engageable with the fixed pin to permit vertical adjustment of the tool holder.

8 Claims, 4 Drawing Figures

INVENTOR
CORNELIS VAN DIJK
BY
Smythe & Moore
ATTORNEYS

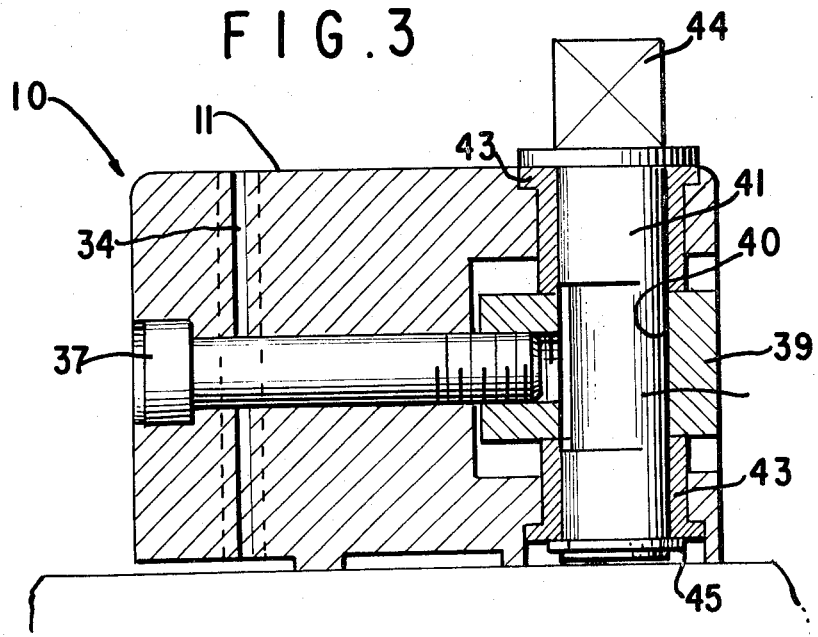
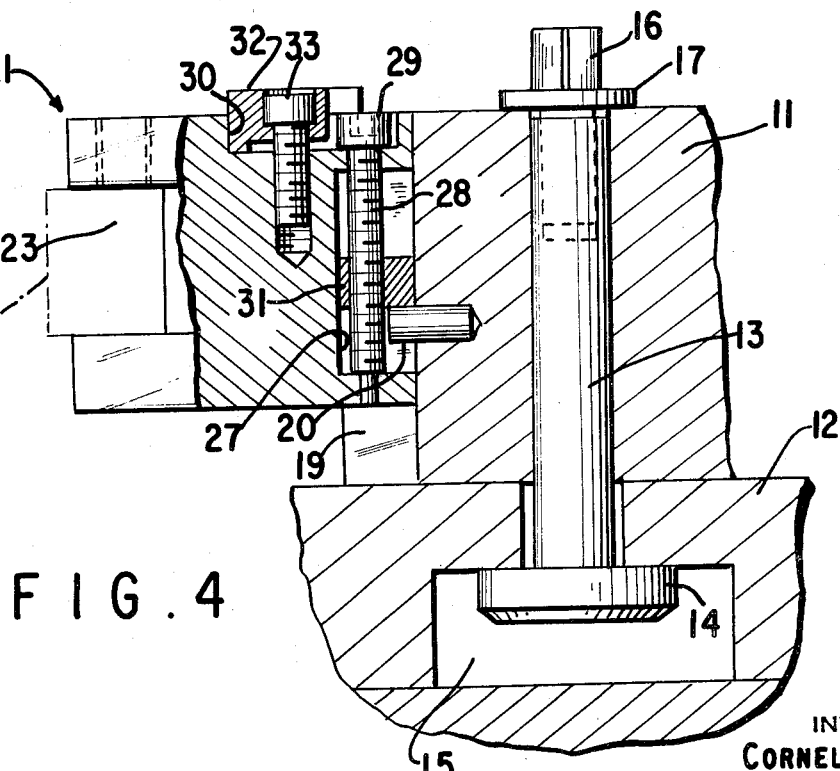

TOOL POST HOLDER

Many forms of tool posts have been devised for mounting of tools on machines. Such tool posts comprise essentially a body having a tool holder slideably mounted thereon, usually by means of a dove-tail slide, and an adjusting structure for adjustably positioning the tool holder with respect to the tool post and locking the tool holder in that position. While it is intended that tool holders rigidly and immovably secure the tool during the machining operation, it is also desirable that the tool posts incorporate structure which permits a substitution of one tool for the other. While such tool posts have been devised, they are disadvantageous in that their design and construction is relatively complicated, they are expensive to manufacture, and it is frequently difficult accurately to position the tool with respect to the tool post.

One of the objects of the present invention is to provide an improved tool post.

Another object of the present invention is to provide a relatively solid tool post which is economical to manufacture and which includes simple height adjustment of the tool.

According to one aspect of the present invention, a tool post may comprise a body having a substantially rectangular cross section and a vertical slide surface across one corner thereof. The slide surface is provided with a vertical sliding groove and a tool holder has a dove-tail slide received within the groove. The tool holder slide is provided with a vertical slot which receives a pin fixed in the slide groove. An adjusting bolt is positioned in the tool holder and extends through the slot of the slide and carries a traveling nut which is engageable with the pin. The tool holder is thus adjusted vertically on the tool post body by adjusting of the adjusting screw which is clamped in position by means of a suitable clamp on the upper surface of the tool holder.

A vertical slit is provided in the body and opens to the slide groove to permit loosening of the tool holder slide within the groove and thereby enables the holder to be removed. A bolt passes through the vertical slit into the main body portion and has its ends secured in a laterally movable block whose position is adjusted by means of an eccentric.

Other objects, advantages and features of the present invention will become apparent from the accompanying description and drawings, which are merely exemplary.

In the Drawings:

FIG. 3 is a sectional view taken along the line 3—3 of FIG. 2; and

FIG. 4 is a sectional view taken along the line 4—4 of FIG. 2.

Proceeding next to the drawings wherein like reference symbols indicate the same parts throughout the various views, a specific embodiment of the present invention will be described in detail.

Figure 1:
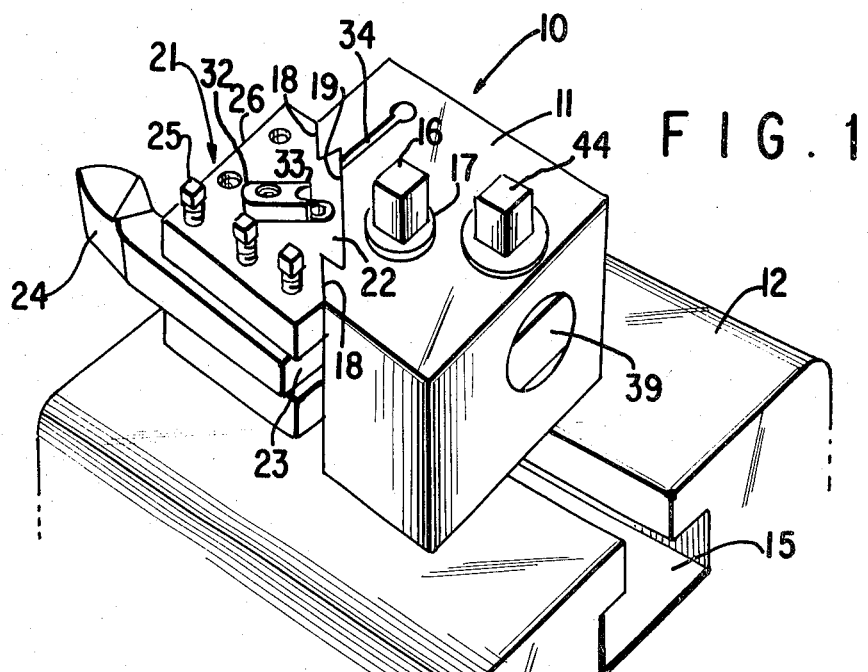
FIG. 1 is an overall perspective view of the tool post according to the present invention.
Figure 2:
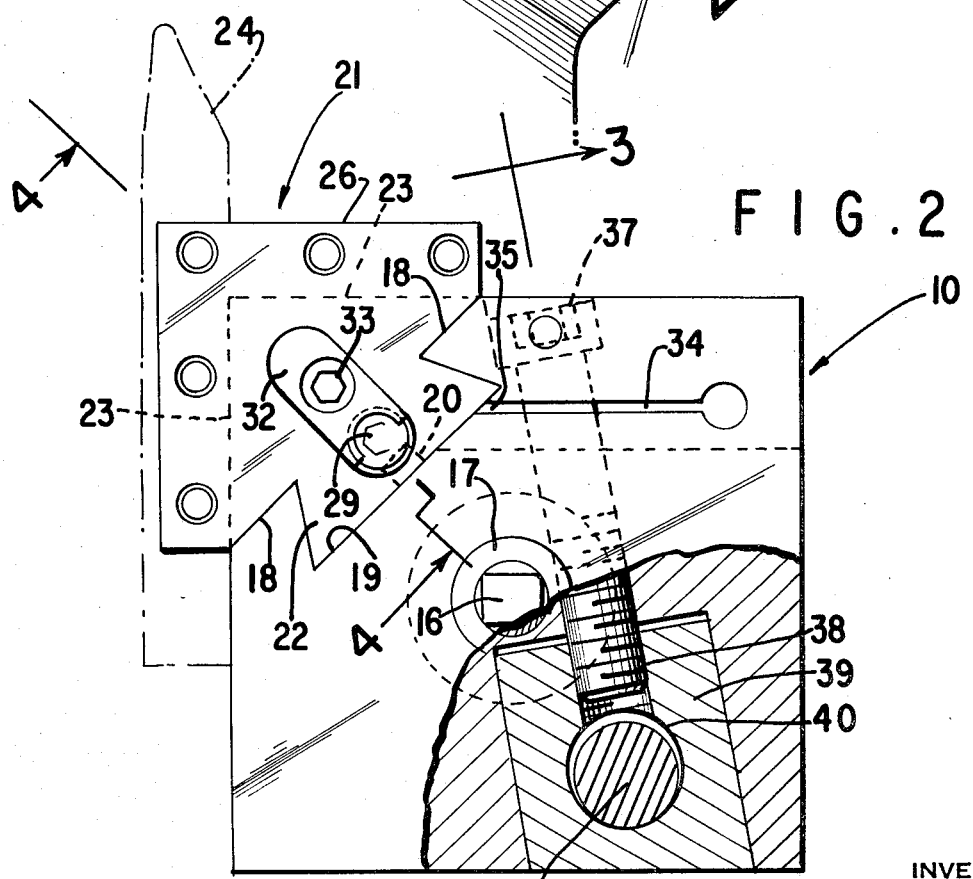
FIG. 2 is a top plan view of the tool post of FIG. 1 with a portion of the tool post being shown in section.

A tool post according to the present invention is indicated generally at 10 (FIG. 1) and comprises a body 11 having a substantially rectangular cross section mounted on a slide 12 of a machine tool by means of a bolt 13 having a head 14 which is received with a T-shaped slot 15. The bolt 13 is received in a vertical bore in the body 11 and has a bore in its upper end to threadedly receive an adjusting bolt 16 having a square head and resting upon a washer 17.

Across one corner of the tool post body 11 there is provided a slide surface 18 in which is formed a slide groove 19. A pin 20 which may be seen in FIG. 4 is fixedly mounted in the tool post body 11 and extends into the groove 19.

A tool holder 21 is provided with a dove-tail slide 22 which is slideably received in the groove 19 to permit a vertical sliding of the tool holder on the slide surface 18. The tool holder 21 is provided with a horizontal slot 23 within which is slideably received a tool 24 fixed in position by means of a plurality of set or locking screws 25. A similar groove 23 may be provided along the other face 26 of the tool holder to provide added flexibility in mounting of the tool.

The tool holder slide 22 is provided with a vertically extending slot 27 which may be seen in FIG. 4 and through which passes an adjusting bolt 28 having its head 29 positioned within a recess 30 formed in the top face of the tool holder. A traveling nut 31 is threaded upon the bolt 28 so as to be engageable with the fixed pin 20.

The adjusting bolt 28 may be clamped in its adjusted position by means of a clamp 32 also positioned in the recess 30 and secured in place by means of a clamping screw 33 threaded into the tool holder.

In order vertically to adjust the tool holder 21, bolt 28 is turned to cause traveling nut 31 to bear against pin 20. In this manner the tool holder 21 is adjusted upwardly. The limits of vertical adjustment of the tool holder are defined by the lengths of the slot 27. Such a tool post will usually provide for a vertical adjustment of about 2 inches, depending upon the thickness of the tool bit. No shims, protruding bolts, or other components are required for the vertical adjustment of the tool holder.

In order to clamp the tool holder 21 in its adjusted vertical position, tool post body 11 is provided with a vertical slit 34 which opens at 35 into the slide groove 19. Slit 34 defines a movable body portion 36 through which passes a bolt 37 in a substantially horizontal position into the main body portion of the tool post. The inner end of bolt 37, indicated at 38, is threadedly received within block 39 which is mounted for limited lateral movement within the tool post body. Block 39 is provided with a vertical bore 40 through which passes bolt 41 having an eccentric portion 42 which is disposed in the bore 40 of the block 39. Bolt 41 is journaled in bushings 43 and has a substantially square head 44 to facilitate manipulation thereof. The other end of bolt 41 is retained in position by means of a retaining ring 45.

As the bolt 41 is rotated, its eccentric portion 42 which is engageable within the bore of block 39 will cause a lateral movement of the block. This lateral movement will cause bolt 37 to move axially, and when bolt 37 moves axially toward the left as viewed (FIG. 3), it can be seen that the movable body portion 36 will move outwardly to loosen the tool holder in the slide groove 19. Upon adjusting of the tool holder or upon replacing of the tool holder, bolt 41 may be rotated again to cause bolt 37 to clamp body portion 36 against tool holder slide 22 to retain the tool holder in a fixed and immovable position upon the tool post. It also is possible not to use the eccentric for clamping purposes but to depend only on the tightening of bolt 37 in a threaded hole in the block.

It is thus apparent that the tool post of the present invention is simple to operate since it provides for a one-step tightening and is economic to manufacture since it is of solid steel and only two sides need be square. This tool post permits a re-indexing accuracy within 0.0001 inches. All of the bolts, bushings, and retaining rings used in the tool post are standard and can be readily obtained through usual commercial sources. The use of a solid piece of steel for the present tool holder provides absolute rigidity and thus prevents vibration. As a result, damage to high-speed tools and especially to carbide tools normally occurring with or without the use of regular tool holders is substantially reduced.

It will be understood that various details of construction and arrangement of parts may be made without departing from the spirit of the invention except as defined in the appended claims.

What is claimed is:

1. A tool post comprising a body having a vertical slide surface thereon, there being a vertical slide groove in said surface, a tool holder having a dove-tail slide received within said groove, there being a vertical slot in said tool holder slide, a pin fixed to said body in said slide groove and extending into said tool holder slide slot, an adjusting bolt on said tool holder and extending within said slot, and a traveling nut on said bolt and engageable with said pin whereby said tool holder is adjusted vertically on said tool post body.

2. A tool post as claimed in claim 1 and comprising means on said tool holder for clamping said adjusting bolt.

3. A tool post as claimed in claim 1 wherein there is a vertical slit in said body opening into said slide groove to define a body portion movable with respect to the main body portion, and means for retaining said movable body portion in position with respect to the main body portion to clamp said tool holder slide in said slide groove.

4. A tool post as claimed in claim 3 wherein said retaining means comprises a bolt passing through said movable body portion into said main body portion.

5. A tool post as claimed in claim 4 and comprising means in said main body portion acting against the end of the bolt for moving said bolt axially to permit the tool holder slide to be moved in said groove.

6. A tool post as claimed in claim 5 wherein said bolt moving means comprises a block threadedly receiving the end of the bolt, said block having a bore therethrough and eccentric means within said bore whereby actuation of said eccentric means causes lateral movement of said block and axial movement of said bolt.

7. A tool post as claimed in claim 6 wherein said eccentric means comprises a bolt rotatably mounted within said main body portion, an eccentric on said bolt with said eccentric being within said block bore, an end of said bolt protruding above the upper face of said body so as to be actuable thereon.

8. A tool post comprising a body having a vertical slide surface thereon, there being a vertical slide groove in said surface, a tool holder having a dove-tail slide received in said groove, a vertical slit in said body opening into said slide groove to define a body portion movable with respect to the main body portion, bolt means extending through said body portion and across said slit and into said main body portion movable means in said main body portion in which said bolt is threadedly received, eccentric means cooperating with said movable means, and means to turn said eccentric means so as to exert force on said body portion to clamp said tool holder firmly in place.

* * * * *

UNITED STATES PATENT OFFICE
CERTIFICATE OF CORRECTION

Patent No. 3,680,416                    Dated August 1, 1972

Inventor(s) Cornelis van Dijk

It is certified that error appears in the above-identified patent and that said Letters Patent are hereby corrected as shown below:

Patent Front Page, [72], "Van" should be --van--.
Column 3, line 35, "2," should be --2.--. Column 4, line 20, "7" should be --7.--; Column 4, line 26, "8" should be --8--; Column 4, line 33, comma (,) omitted after "portion".

Signed and sealed this 2nd day of January 1973.

(SEAL)
Attest:

EDWARD M. FLETCHER, JR.                 ROBERT GOTTSCHALK
Attesting Officer                        Commissioner of Patents